United States Patent
Ghannam et al.

(10) Patent No.: US 10,071,700 B1
(45) Date of Patent: Sep. 11, 2018

(54) REAR IMPACT GUARD FOR A VEHICLE

(71) Applicant: Ford Global Technologies, LLC, Dearborn, MI (US)

(72) Inventors: Mahmoud Yousef Ghannam, Canton, MI (US); Swadad A. Carremm, Canton, MI (US); Clara Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/457,383

(22) Filed: Mar. 13, 2017

(51) Int. Cl.
*B60R 19/48* (2006.01)

(52) U.S. Cl.
CPC .................. *B60R 19/48* (2013.01)

(58) Field of Classification Search
CPC ....................................................... B60R 19/48
See application file for complete search history.

(56) References Cited

U.S. PATENT DOCUMENTS

| | | | |
|---|---|---|---|
| 2,660,454 A * | 11/1953 | Coumerilh | B60R 3/00 182/93 |
| 3,378,278 A * | 4/1968 | Letzel | B60R 3/00 280/163 |
| 3,471,070 A * | 10/1969 | Olson | B60R 9/065 224/402 |
| 3,501,190 A * | 3/1970 | McCrea | B60P 3/36 224/42.3 |
| 3,580,613 A * | 5/1971 | Northrop | B60R 3/02 105/447 |
| 4,198,070 A * | 4/1980 | Weiler | B60R 3/02 182/91 |
| 4,707,939 A * | 11/1987 | Bonner | B60R 19/48 40/209 |
| 5,678,872 A * | 10/1997 | Slater | B60R 3/02 292/35 |
| 5,979,953 A * | 11/1999 | Rinehart | B60R 19/48 293/106 |
| 6,116,667 A | 9/2000 | Torcomian | |
| 6,170,842 B1 * | 1/2001 | Mueller | B60R 3/02 280/163 |
| 6,176,529 B1 | 1/2001 | Kitzmiller et al. | |
| 6,604,765 B1 | 8/2003 | Eull | |
| 6,814,378 B1 | 11/2004 | Marmur | |
| 7,086,674 B2 | 8/2006 | Goertz | |
| 7,377,563 B1 * | 5/2008 | Demick | B60R 3/02 280/164.1 |
| 8,011,704 B2 * | 9/2011 | Nees | B60R 19/48 293/106 |

(Continued)

OTHER PUBLICATIONS

Byron Bloch, Auto Safety Design, Inc., "Improved Crashworthy Designs for Truck Underride Guards," Paper No. 98-S4-O-07, Oct. 1, 1998, 16th International Technical Conference on the Enhanced Safety of Vehicles, Windsor, Ontario, Canada, 13 pages.

*Primary Examiner* — Erez Gurari
(74) *Attorney, Agent, or Firm* — Jason C. Rogers; Brooks Kushman P.C.

(57) ABSTRACT

A vehicle includes a frame and a bumper pivotally connected to the frame. A step is attached to the bumper so that the step is pivotal between a storage position and a step position. An actuator is mounted to the frame and coupled to the bumper, and is operable to pivot the bumper relative to the frame between a substantially vertical position and an angled position.

14 Claims, 3 Drawing Sheets

(56) References Cited

U.S. PATENT DOCUMENTS

| | | | |
|---|---|---|---|
| 8,602,467 B2 * | 12/2013 | Lee | B60R 19/48 293/106 |
| 2013/0154229 A1 * | 6/2013 | Kim | B60R 3/02 280/163 |
| 2014/0166713 A1 * | 6/2014 | Kirtland | B60R 9/06 224/521 |

* cited by examiner

REAR IMPACT GUARD FOR A VEHICLE

TECHNICAL FIELD

The present disclosure relates to rear impact guards for vehicles.

BACKGROUND

Some vehicles, such as semi-trucks, have a higher ride height than passenger cars creating potential for a front end of the passenger car to slide under a rear end of the taller vehicle during a collision. This is known as underriding. Accordingly, the United States government has enacted vehicle safety standards that require rear impact guards (also known as underride bumpers) on certain classes of vehicles to reduce instances of underriding. These vehicle safety standards can be found in the Federal Motor Vehicle Safety Standards (FMVSS) codified in Title 49 of the Codified Federal Rules. See FMVSS 223 and FMVSS 224 for specific requirements.

Typical rear impact guards include a horizontal bar rigidly connected to a frame of the vehicle by two or more vertical bars. The horizontal bar is located at height estimated to contact a front bumper of the passenger car during a collision to reduce the likelihood of underriding.

SUMMARY

According to one embodiment, a rear impact guard for a vehicle includes a bumper having side members connected to the vehicle and extending downwardly therefrom and a bottom member extending between the side members. The guard also includes a step having a step surface and pivotally attached between the side members so that the step is movable between a storage position and a step position in which the step surface is substantially parallel to the ground.

According to another embodiment, a vehicle includes a frame and a bumper pivotally connected to the frame. A step is attached to the bumper so that the step is pivotal between a storage position and a step position. An is actuator mounted to the frame and coupled to the bumper, and is operable to pivot the bumper relative to the frame between a substantially vertical position and an angled position.

According to yet another embodiment, a vehicle includes a frame and a rear impact guard having a bumper pivotally supported by the frame. The bumper has side members and a bottom member extending between the side members. An actuator of the rear impact guard is mounted to the frame and is coupled to the bumper. The actuator is operable to pivot the bumper relative to the frame between a substantially vertical position and an angled position in which the bumper is pivoted forwardly and under the frame.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
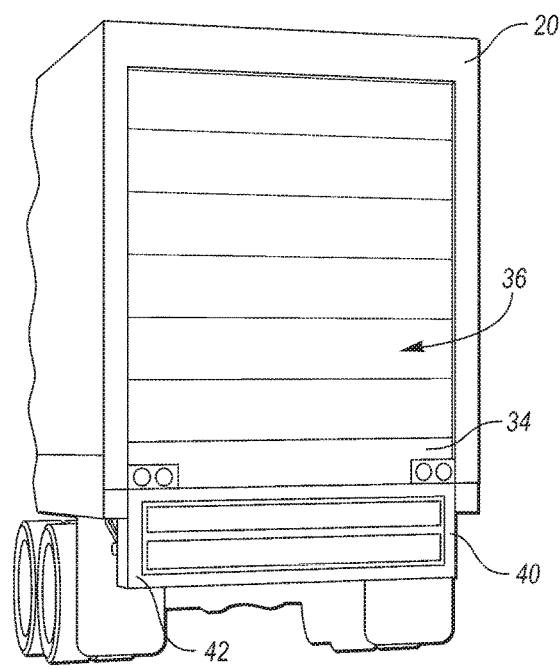
FIG. 1 is a rear perspective view of a vehicle having a rear impact guard.
Figure 2:
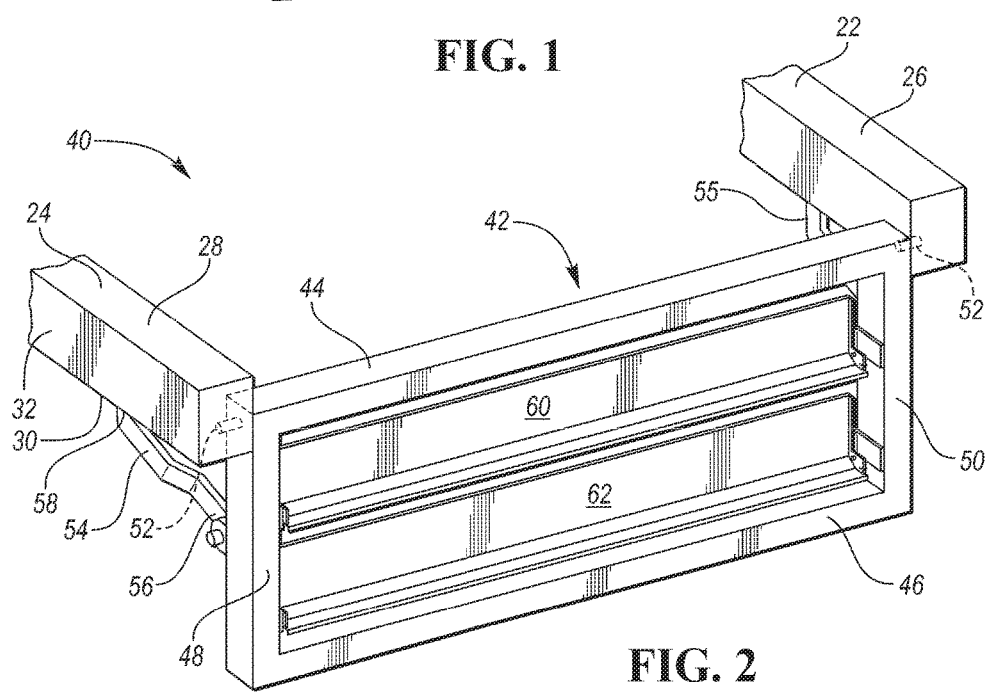
FIG. 2 is a perspective view of the rear impact guard.

Referring to FIGS. 1 and 2, a vehicle 20, such as a large truck or trailer, has a frame 22 including a pair of spaced apart frame rails 24 and 26. Each of the rails 24, 26 may be a rectangular closed-box section having a top 28, a bottom 30, and sidewalls 32 extending therebetween. A deck 34 of the vehicle 20 is supported on the tops 28 of the rails 24, 26 and forms a floor of a storage compartment 36.

The vehicle 20 is equipped with a rear impact guard 40 to comply with government regulations and increase safety to other vehicles. The rear impact guard 40 includes a bumper 42 that extends downwardly from the deck 34 to partially fill the space defined between the deck 34 and the road. During a collision, a front end of a passenger car engages with the bumper 42 to reduce the likelihood of underride and reduce the likelihood of the deck 34 intruding into the passenger compartment of the passenger car. The bumper 42 may include a top member 44, a bottom member 46, and side members 48, 50 that are connected between the top and bottom members. In the illustrated embodiment, the members are connected to each other to form a rectangular structure, however, other geometric configurations are contemplated by this disclosure. The members of the bumper 42 may be tubular and may have a rectangular, circular, or other cross-sectional shape.

The bumper 42 is connected to the frame rails 24, 26 near an upper portion of the bumper. Depending upon the embodiment, the bumper 42 may be rigidly connected to the frame 22 or may be pivotally connected to the frame 22 allowing the bumper 42 to pivot between at least a first position, which may be substantially vertical, and a second position which may be angularly oriented and partially retracted under the bed. As used herein "substantially" means within plus or minus five degrees of the stated value or orientation. The bumper 42 may be rigidly attached to the frame 22 by welding, fasteners, or other means known in the art. Alternatively, the bumper 42 may be pivotally attached to the frame 22 by pins or similar means. For example, pins 52 may each extend through one of the frame rails 24, 26 and one of the side members 48, 50. In the illustrated embodiment, the bumper 42 is connected directly to the frame 22, however, in other embodiments, brackets may be used to facilitate the attachment of the bumper 42 to the frame 22. For example, the pins 52 may be received in holes defined in the brackets.

The rear impact guard 40 may include struts 54, 55 each connecting between one of the frame rails 24, 26 and one of the side members 48, 50. The struts 54 and 55 each have a first end 56 connected to the side member 48 and a second end 58 connected to the frame rail 24. Depending upon the embodiment, the first end 56 may be rigidly or pivotally attached to the side member 48. The first end 56 may be rigidly attached by welding or fasteners, or may be pivotally attached by a pin or the like. The second end 58 may be directly or indirectly connected to the frame rail 24. In the rigid embodiment, the second end 58 may be welded or fastened to the frame rail 24 or a bracket of the frame rail, and in the pivotal embodiment, the second end 58 may be attached to an actuator that is mounted to the frame rail 24. This will be described in more detail below.

The bumper 42 may include one or more cross members vertically located between the top member 44 and the bottom member 46 and connecting between the side members 48, 50. The cross members increase the strength of the bumper 42 and provide collision surfaces that a vehicle may impact during a collision. The cross members may be stationary and welded to the side members 48, 50. In some designs, the cross members may be utilized as steps for accessing the storage compartment 36. In the illustrated embodiment, the cross members are steps that are pivotal relative to the side members 48, 50. For example, the bumper 42 may include an upper step 60 and a lower step 62.

Figure 3:
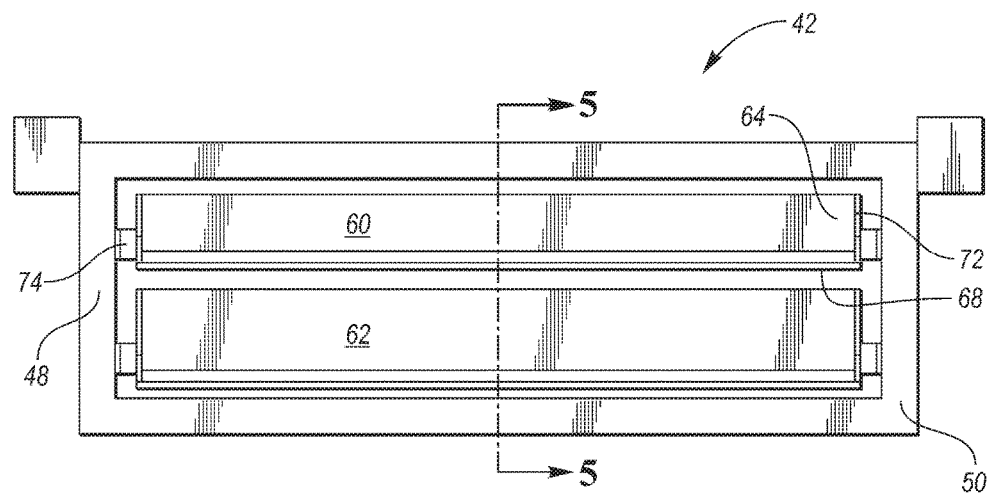
FIG. 3 is a rear elevation view of the rear impact guard.
Figure 4:
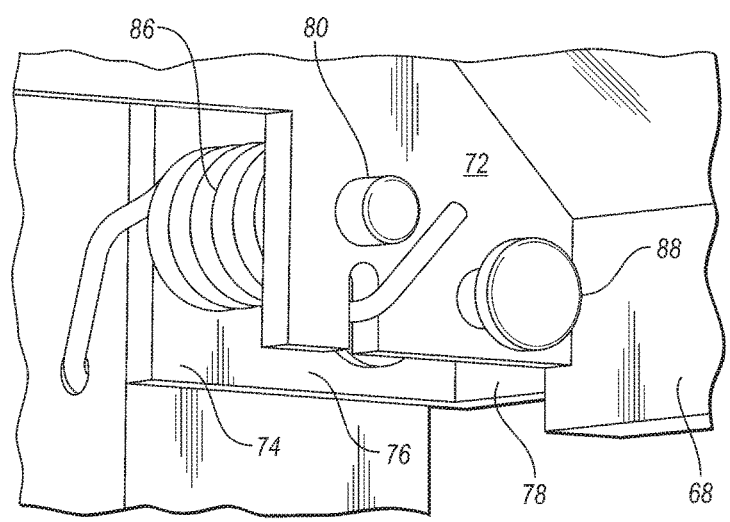
FIG. 4 is perspective of view of a connection that attaches a step to a bumper of the rear impact guard.
Figure 5:
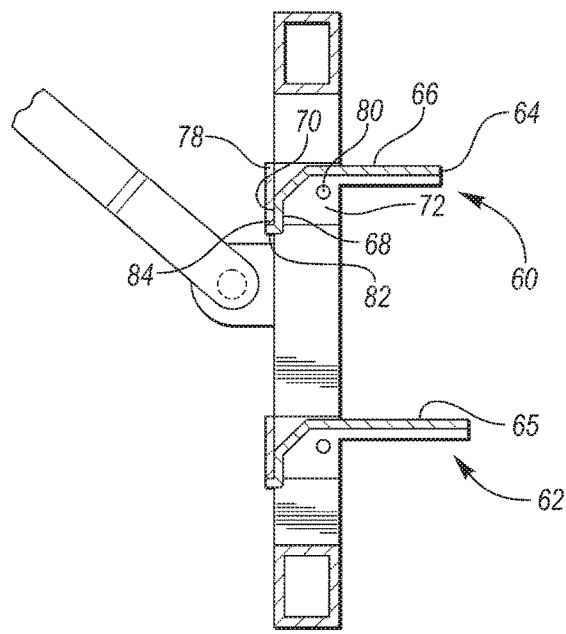
FIG. 5 is a side cross-sectional view of the rear impact guard at cutline 5-5 showing the steps in a step position.

Referring to FIGS. 3, 4, and 5, the upper step 60 may include a first plate 64 defining a step surface 66 and a second plate 68 defining a back surface 70 that is oriented substantially perpendicular to the step surface 66. A pair of side plates 72 are connected to the plates 64 and 68 at the ends of the step 60. Each of the sides plates 72 may be pivotally attached to a corresponding one of the side members 48, 50 with a bracket 74 as shown, or may be directly attached to the side members. Each of the brackets 74 may be L-shaped and include a side plate 76 attached to one of the side members 48, 50 and a back plate 78 projecting inwardly from the side plate 76.

The upper step 60 may be pivotally attached to the side members 48 and 50 by a pair of pins 80 that each extend through one of the brackets 74 and one of the side plates 72. The upper step 60 is movable between a storage position (FIG. 3) and a step position (FIG. 5). The step 60 may be biased to the storage position by one or more biasing members 86. The biasing members 86 may be coil springs received around the pins 80 and engaging between the brackets 74 and the side plates 72.

The upper step 60 is deployed from the storage position to the step position by folding the first plate 64 downwardly towards the ground causing the step 60 to pivot about the pins 80. The back plates 78 act as a stopper and engage with the second plate 68 of the step 60 to prevent rotation of the step 60 past the step position. For example, the second plate 68 may include a flange 82 that engages with a bottom edge 84 of each bracket. One or more latches 88 may be provided to secure the step 60 in the step position. The latch 88 may be a spring-loaded pin located on the side plate 72 and receivable within a sleeve (not shown) defined in the bracket 74 to lock the step 60 in place. The step 60 is rotated back to the storage position by releasing the latch 88 and rotating the step 60 upwardly with the assistance of the biasing members 86. The bracket 74 may include a second sleeve (not shown) that receives the pin of the latch 88 to secure the step 60 in the storage position.

The lower step 62 may be the same or similar to the upper step 60, and attached to the bumper 42 and operated in a same or similar manner. The first plate 65 of the lower step 62 may be wider than the first plate 64 of the upper step 60 to facilitate climbing the steps.

Figure 6:
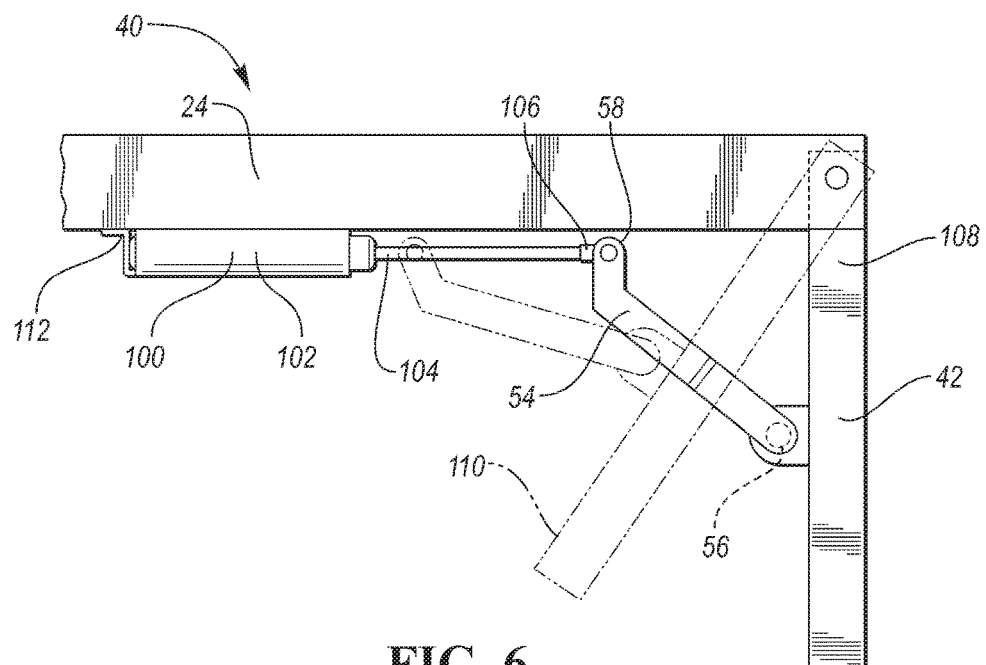
FIG. 6 is a side view of the rear impact guard illustrating different positions of the underride bumper.

Referring to FIG. 6, the rear impact guard 40 may be pivotal with respect to the frame 22 and include one or more actuators 100 that control the angular position of the bumper 42. The actuators 100 may be hydraulic, pneumatic, mechanical, or electrical. The actuator 100 is illustrated as a hydraulic cylinder having a cylinder body 102 mounted to the frame rail 24 by a bracket 112 and a piston rod 104 that is movable relative to the cylinder body 102. A pair of hydraulic lines (not shown) are connected to the cylinder body 102 and selectively provide fluid to one or more chambers within the cylinder body 102 to actuate the rod 104. The second end 58 of the strut 54 is connected to the distal end 106 of the rod 104 using a pin or other connection that allows rotation of the strut 54 relative to the rod 104. The vehicle 20 may also include a second actuator that is mounted to the frame rail 26 and is connected with the strut 55.

The one or more actuators 100 are operable to pivot the bumper 42 between at least a first substantially vertical 108, and a second angled position 110 in which the bumper 42 is retracted upwardly under the vehicle. The vehicle 20 may include a user interface that allows the driver of the vehicle to control the actuator 100 to raise or lower the bumper 42 as desired. For example, the driver can actuate the bumper 42 to the second position 110 to gain additional ground clearance, and lower the bumper 42 to the first position while driving on the roadways. One or more sensors associated with the guard 40 may be provided to inform the driver of the angular position of the bumper 42. The sensors may be optical, ultrasonic, mechanical, magnetic (e.g., hall effect sensor), or the like.

Non-movable bumpers are effective in reducing underride, but act as a rigid barrier. The pivotal embodiments of this disclosure not only reduce underride, but also lessen impact forces to the vehicles involved in the collision. The one or more actuators 100 may be configured to dampen impact forces during a collision by allowing controlled forward pivoting of the bumper 42. For example, the actuator 100 can dampen collision energy by allowing the rod 104 to slide into the cylinder body 102 in a controlled manner. The actuator 100 may include a relief valve that allows pressure to be released during a collision to absorb impact forces. The cylinder bodies 102, the rods 104, the struts 54, 55, and the brackets 112 may be designed to deform in response to a collision with the bumper 42 to further absorb impact forces.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rear impact guard for a vehicle comprising:
   a bumper including side members connected to the vehicle and extending downwardly therefrom and a bottom member extending between the side members, wherein the bumper is pivotally attached to the vehicle and is pivotal between a substantially vertical position and angled position in which the bumper is folded under the vehicle; and
   a step including a step surface and pivotally attached between the side members so that the step is movable between a storage position and a step position in which the step surface is substantially parallel to the ground.

2. The rear impact guard of claim 1, wherein the step surface is substantially parallel to the side members when in the storage position.

3. The rear impact guard of claim 1, wherein the bumper further includes a bracket attached to one of the side members and engageable with the step to prevent pivoting of the step beyond the step position.

4. The rear impact guard of claim 3, wherein bracket is L-shaped and includes a side plate attached to one of the side members and a back plate engageable with a surface of the step.

5. The rear impact guard of claim 4, wherein the surface is substantially perpendicular to the step surface.

6. The rear impact guard of claim 1, wherein the step further includes a side panel pivotally attached to one of the side members by a pin.

7. The rear impact guard of claim 1 further comprising:
a spring engaging between the bumper and the step and configured to urge the step to the step position.

8. The rear impact guard of claim 1 further comprising:
a second step including a second step surface and pivotally attached between the side members so that the second step is movable between a storage position and a step position in which the step surface is substantially parallel to the ground.

9. The rear impact guard of claim 8, wherein the second step surface is wider than the step surface.

10. The rear impact guard of claim 1 further comprising:
an actuator mounted to the vehicle and coupled to the bumper, and operable to pivot the bumper between the substantially vertical position and the angled position.

11. A vehicle comprising:
a frame;
a bumper pivotally connected to the frame;
a step attached to the bumper so that the step is pivotal between a storage position and a step position; and
an actuator mounted to the frame and coupled to the bumper, and operable to pivot the bumper relative to the frame between a substantially vertical position and an angled position.

12. The vehicle of claim 11 wherein the actuator is configured to absorb impact energy during a collision allowing the bumper to pivot towards the angled position.

13. The vehicle of claim 11, wherein the actuator further includes a cylinder body mounted to the frame and a slidable rod connected to the bumper.

14. The vehicle of claim 13, wherein the actuator is configured to absorb impact energy during a collision by receiving the rod into the cylinder body allowing the bumper to pivot towards the angled position.

* * * * *